US007783416B2

(12) United States Patent
Sugawara et al.

(10) Patent No.: US 7,783,416 B2
(45) Date of Patent: Aug. 24, 2010

(54) NAVIGATION SERVER

(75) Inventors: Aiko Sugawara, Minato-ku (JP); Tadafumi Nogawa, Minato-ku (JP); Takeshi Imai, Minato-ku (JP); Takeyasu Suzuki, Kawasaki (JP); Yasunori Hada, Koufu (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/666,510

(22) PCT Filed: Mar. 26, 2008

(86) PCT No.: PCT/JP2008/055651

§ 371 (c)(1),
(2), (4) Date: Dec. 23, 2009

(87) PCT Pub. No.: WO2009/001595

PCT Pub. Date: Dec. 31, 2008

(65) Prior Publication Data

US 2010/0174482 A1 Jul. 8, 2010

(30) Foreign Application Priority Data

Jun. 27, 2007 (JP) ............................ 2007-168916

(51) Int. Cl.
*G06F 19/00* (2006.01)

(52) U.S. Cl. ........................ 701/117; 701/201; 701/209

(58) Field of Classification Search ................. 701/117, 701/201, 209; 340/905
See application file for complete search history.

(56) References Cited

U.S. PATENT DOCUMENTS 6,853,915 B2 * 2/2005 Hubschneider et al. ..... 701/209

(Continued)

FOREIGN PATENT DOCUMENTS

JP 2004-156941 6/2004
JP 2004-333377 11/2004
JP 2006-244265 9/2006

OTHER PUBLICATIONS

National Research Institute for Earth Science and Disaster Prevention, "Sharing Information on Damage and Activity Situation for Disaster," *Field Test with Respect to Application of Information Sharing Technology to Disaster Relief Service in Mitsuke City*, pp. 52, 95-98 (2007).

International Search Report for Application No. PCT/JP2008/055651, dated May 1, 2008.

*Primary Examiner*—Mark Hellner
*Assistant Examiner*—Helal A Algahaim
(74) *Attorney, Agent, or Firm*—Lahive & Cockfield, LLP; Anthony A. Laurentano

(57) ABSTRACT

A navigation server capable of guiding a mobile subject such as an automobile by a navigation device, while appropriately evaluating the level of safeness of individual link in a disaster occurring area in consideration of the actual disaster condition is provided. According to the navigation server of the present invention, the links included in the disaster occurring area are extracted, and the cost of each of the extracted links is evaluated on the basis of the probe information. There is high probability that the spatial and temporal moving pattern of the automobile (a first mobile subject) represented by the probe information reflects the influence of the disaster. Therefore, the level of the safeness of individual link included in the disaster occurring area may be evaluated as the cost of individual link accurately in consideration of the actual disaster condition and road condition. Further, by transmitting the road traffic information generated on the basis of the cost of individual link to the navigation device, it becomes possible to make the navigation device guide the automobile (a second mobile subject) to avoid the influence of the disaster in consideration of the actual disaster condition and road condition.

6 Claims, 6 Drawing Sheets

U.S. PATENT DOCUMENTS 6,885,936 B2 * 4/2005 Yashio et al. ............... 701/207
2004/0143387 A1 * 7/2004 Shimizu et al. ............. 701/209
2005/0206534 A1 * 9/2005 Yamane et al. .............. 340/994
2006/0167616 A1 * 7/2006 Yamane et al. .............. 701/117
2010/0017110 A1 * 1/2010 Sengoku et al. ............. 701/200
2010/0057346 A1 * 3/2010 Ehrlacher ................... 701/202

* cited by examiner

NAVIGATION SERVER

RELATED APPLICATIONS

This application is a 35 U.S.C. 371 national stage filing of International Application No. PCT/JP2008/055651, filed Mar. 26, 2008, which claims priority to Japanese Patent Application No. 2007-168916 filed on Jun. 27, 2007 in Japan. The contents of the aforementioned applications are hereby incorporated by reference.

BACKGROUND OF THE INVENTION

1. Technical Field

The present invention relates to a navigation server which supports guiding of a mobile subject by a navigation device, by transmitting a road traffic information to the navigation device possessed by the mobile subject.

2. Description of the Related Art

There is proposed a technique of promptly setting a detour route and informing the detour route and the like to a navigation device mounted on an automobile, when a disaster such as an earthquake or a flood occurred in an area, or when it is predicted that the disaster will occur in an area, so that the automobile traveling in that area may avoid the influence of the disaster (see Japanese Patent Laid-Open No. 2004-156941).

However, in the prior art mentioned above, a spot having high possibility of becoming an obstacle to the traveling of the automobile by the occurrence of the disaster is determined on the basis of a simulation or the like, and the detour route is set so as to avoid passing of the spot. Therefore, in the case where the simulation result deviates from the actual disaster condition, there is a possibility that the detour route which is inappropriate in consideration of the disaster condition may be set. For example, there is a possibility that a route unnecessarily detouring links having significantly low possibility of becoming an obstacle to the traveling of the automobile may be set. Further, in contrast thereto, there is a possibility that a detour route including a link having high possibility of becoming an obstacle to the traveling of the automobile will be set. Therefore, there is a fear that the user being informed of the detour route via the navigation device (car navigation) may be confused.

SUMMARY OF THE INVENTION

In view of the above circumstances, an object to be solved by the present invention is to provide a navigation server which is capable of accurately evaluating the level of safeness of each link in a disaster occurring area in consideration of an actual disaster condition, and is capable of supporting guiding of a mobile subject such as an automobile by a navigation device.

According to a first aspect of the present invention, there is provided a navigation server which supports guiding of a mobile subject by a navigation device, by transmitting a road traffic information to the navigation device possessed by the mobile subject, the navigation server comprising: a support map storing unit which stores a support map information including a plurality of links expressed by a series of coordinates; a first support processing element which receives positions at plural points in time of a first mobile subject from a probe device possessed by the first mobile subject as a probe information; and a second support processing element which generates the road traffic information on the basis of the support map information and the probe information, and which transmits a part of or all of the road traffic information to the navigation device possessed by a second mobile subject; wherein the second support processing element recognizes an area in which disaster occurred on the basis of communication with a disaster information source, extracts the links included in the area from a plurality of the links, evaluates a cost for each of the extracted links on the basis of the probe information, and generates the road traffic information on the basis of the cost.

According to the navigation server of the first aspect of the invention, the links included in the disaster occurring area are extracted, and the cost of each of the extracted links is evaluated on the basis of the probe information. There is a high probability that the influence of the disaster is reflected in the spatial and temporal moving pattern of the first mobile subject which is represented by the probe information. Therefore, the level of safeness of individual link in the disaster occurring area may be evaluated as the cost of each link accurately in consideration of the actual disaster condition and the road condition. Further, by transmitting the road traffic information generated on the basis of the cost of each link to the navigation device, it becomes possible to make the navigation device guide the second mobile subject to avoid the influence of the disaster in consideration of the actual disaster condition and road condition.

The navigation server according to a second aspect of the invention is a navigation server according to the first aspect of the invention, wherein the second support processing element evaluates the cost of the links included in the road having high frequency of the first mobile subject passing therethrough after the occurrence of the disaster to be low.

According to the navigation server of the second aspect of the invention, the cost is evaluated while taking into consideration that the links included in the road having high frequency of the first mobile subject passing therethrough after occurrence of the disaster have high probability of being less affected by the disaster and therefore safe. Therefore, by transmitting the road traffic information generated on the basis of the cost of individual link to the navigation device, it becomes possible for the second mobile subject to be guided so as to avoid the influence of the disaster in consideration of the actual disaster condition and road condition.

The navigation server of a third aspect of the invention is the navigation server according to the first aspect of the invention, wherein the second support processing element evaluates the cost of the links included in the road having high frequency of the first mobile subject reversing a direction of movement thereof after the occurrence of the disaster to be high.

According to the navigation server of the third aspect of the invention, the cost is evaluated while taking into consideration that the links included in the road having high frequency of the first mobile subject reversing the direction of movement after occurrence of the disaster have high probability of being affected by the disaster and therefore not safe. Therefore, by transmitting the road traffic information generated on the basis of the cost of individual link to the navigation device, it becomes possible for the second mobile subject to be guided so as to avoid the influence of the disaster in consideration of the actual disaster condition and road condition.

The navigation server according to a fourth aspect of the present invention is the navigation server according to the first aspect of the invention, wherein the second support processing element recognizes the navigation route set by the navigation device on the basis of communication with the navigation device possessed by the first mobile subject, and evaluates the cost of the links included in the road included in the navigation route and also included in the road having high frequency of departing from the traveling route of the first mobile subject after the occurrence of the disaster to be high.

According to the navigation server of the fourth aspect of the invention, the cost is evaluated while taking into consideration that the links included in the navigation route set by the navigation device possessed by the first mobile subject and at the same time included in the road departing from the actual traveling route of the first mobile subject after the occurrence of the disaster have high probability of being affected by the disaster to an extent that the first mobile subject must avoid that road and therefore not safe. Therefore, by transmitting the road traffic information generated on the basis of the cost of individual link to the navigation device, it becomes possible for the second mobile subject to be guided so as to avoid the influence of the disaster in consideration of the actual disaster condition and road condition.

The navigation server according to a fifth aspect of the invention is the navigation server according to the first aspect of the invention, wherein the second support processing element calculates a deviation of the probe information from before and after the occurrence of the disaster, and evaluates the cost of the links included in the road having large deviation to be high.

According to the navigation server of the fifth aspect of the invention, the cost is evaluated while taking into consideration that the links included in the road having large deviation of the probe information from before and after the occurrence of the disaster have high probability of being affected by the disaster and therefore not safe. Therefore, by transmitting the road traffic information generated on the basis of the cost of individual link to the navigation device, it becomes possible for the second mobile subject to be guided so as to avoid the influence of the disaster in consideration of the actual disaster condition and road condition.

The navigation server according to a sixth aspect of the invention is the navigation server according to the first aspect of the invention, wherein the second support processing element recognizes a departure position and destination position of the second mobile subject by communicating with the navigation device, sets a support route which connects the departure position and the destination position so as to preferentially include the links having low cost, and generate information representing a part of or all of the support route as the road traffic information.

According to the navigation server of the sixth aspect of the invention, the support route which connects the departure position and the destination position of the second mobile subject is set, and information representing a part of or all of the support route is set as the road traffic information. As is explained above, the level of safeness of individual link in the disaster occurring area may be evaluated as the cost of individual link accurately in consideration of the actual disaster condition and the road condition. Therefore, by transmitting the road traffic information to the navigation device, it becomes possible to make the navigation device guide the second mobile subject to avoid the influence of the disaster in consideration of the actual disaster condition and road condition.

DETAILED DESCRIPTION OF THE PREFERRED EMBODIMENTS

An embodiment of a navigation server according to the present invention will now be explained below with reference to the accompanying drawings.

Figure 1:
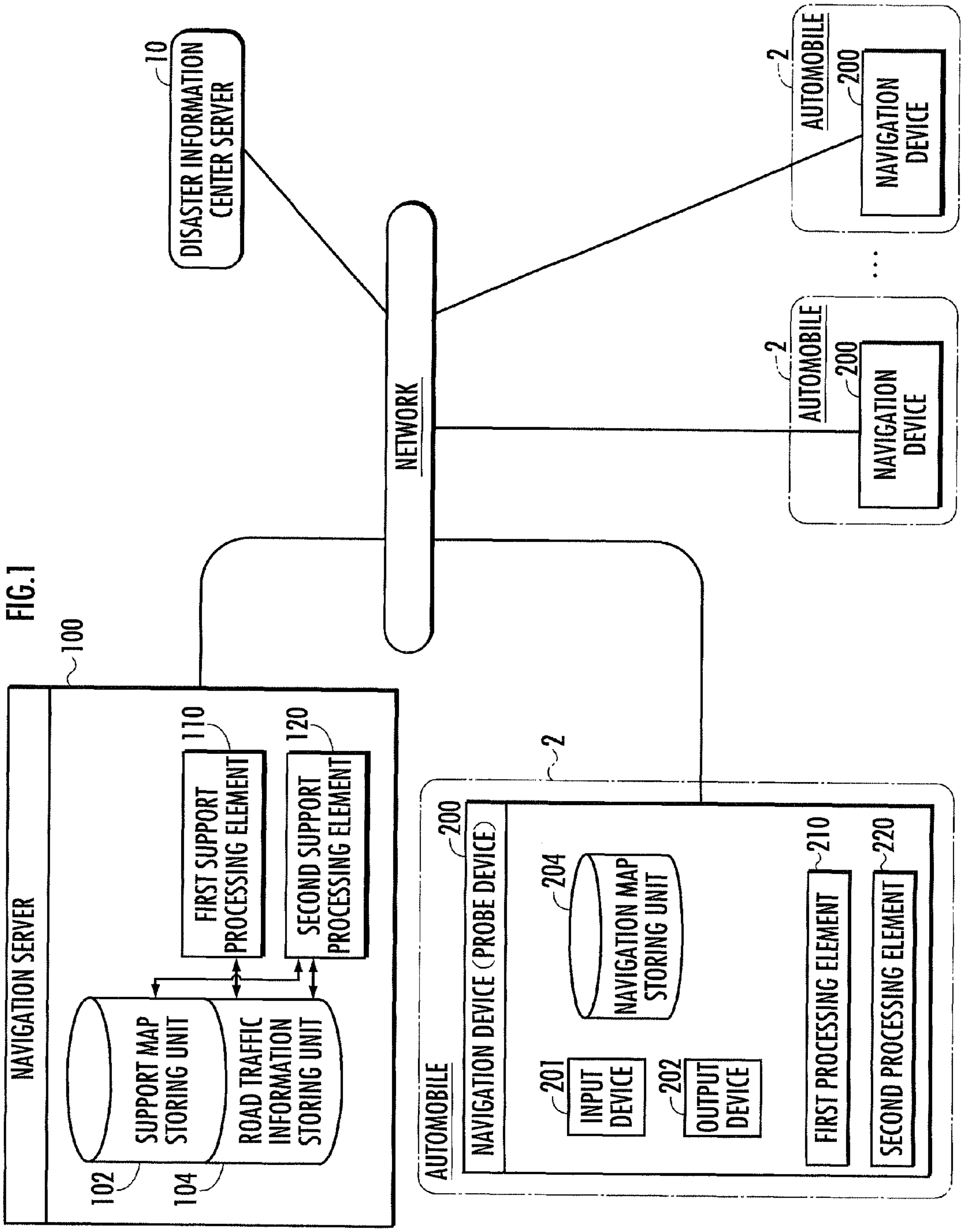
FIG. 1 is a structural diagram illustrating a configuration of a navigation server according to the present invention.

The configuration of the navigation system of the present invention will be described below. A navigation server 100 illustrated in FIG. 1 is configured from one or a plurality of computers capable of communicating via a network a disaster information center server 10 and a navigation device (corresponds also to "a probe device") 200 mounted on an automobile (mobile subject) 2, respectively. It should be noted that the navigation device 200 may be mounted in a mobile device other than an automobile. It is also acceptable for the navigation device 200 to be carried by a user (corresponds to one type of the mobile subject).

The navigation server 100 is equipped with a support map storing unit 102, a road traffic information storing unit 104, a first support processing element 110, and a second support processing element 120.

The support map storing unit 102 is stored with support map information. In the support map information, the location, shape and posture of an individual link constituting a road are expressed by a series of coordinates ((latitude, longitude), or (latitude, longitude, altitude)). Moreover, an individual link is tagged with link identifier for identifying the individual link.

The road traffic information storing unit 104 is stored with probe information transmitted to the navigation server 100 from the navigation device 200, or road traffic information transmitted from a road traffic information center server or the like to the navigation server 100.

The first support processing element 110 receives positions at plural points in time of the automobile 2 from the navigation device (the probe device) 200 mounted on the automobile 2 as "the probe information". The probe information is added with a number (VIN) for identifying the automobile 2, which makes it possible to identify each of the numerous probe information as the probe information from a specific automobile 2. The first support processing element 110 receives road traffic information such as the traveling cost of the individual link, from the road traffic information center server or the like.

The second support processing element 120 extracts the links included in an area in which disaster has occurred, on the basis of communication with the disaster information center server (disaster information source) 10, and evaluates a cost for each of the extracted links on the basis of the probe information and the like. The second support processing element 120 generates the road traffic information on the basis of the support map information, the probe information (and the road traffic information obtained from the road traffic information center), and the cost. The second support processing element 120 transmits a part of or all of the road traffic information to the navigation device 200.

The navigation device 200 is comprised of an ECU or a computer mounted in the automobile 2 as hardware, and a navigation program which is stored in a memory and which provides the computer with various functions as software. The navigation program may be pre-installed in the memory (ROM) in the vehicular computer, or a part of or all of the navigation program may be downloaded or broadcasted from a server (not shown) via a network or a satellite to the vehicular computer to be stored in the memory (EEPROM, RAM) or the like thereof at an arbitrary timing when there is a request or the like from the vehicular computer.

The navigation device 200 is equipped with an input device 201, an output device 202, a navigation map storing unit 204, a first processing element 210, and a second processing element 220.

The input device 201 is comprised of operating buttons or a microphone disposed in a center console or the like of the automobile 2, and enables a user to perform various settings by operation or voice output. The output device 202 is a display device disposed in the center console of the automobile 2 for displaying or outputting navigation map information and the like. The navigation map storing unit 204 is stored with the navigation map information or the like to be output to the output device 202. In the navigation map information, the location, shape and posture or the like of an individual link constituting a road are expressed by a series of coordinates. Moreover, an individual link is tagged with the link identifier for identifying the individual link. Even though the definitions of the coordinates and the like in the navigation map information and the support map information are different due to the different specifications and data architectures therebetween, it is possible to match the links by tagging the identical links with common link identifier.

The first processing element 210 makes the navigation server 100 recognize a departure position $p_1$ and a destination position $p_2$ of the automobile 2, on the basis of communication with the navigation server 100. The second processing element 220 recognizes a part of or all of the road traffic information generated at the navigation server 100, on the basis of communication with the navigation server 100. The second processing element 220 sets a navigation route r on the basis of the road traffic information and the navigation map information stored in the navigation map storing unit 204, and makes the output device 202 output the navigation route r.

It should be noted that the term a component of the navigation server 100 or the navigation device 200 "recognizes" information means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packages; and stores in memory or the like the calculated information or the like.

The function of the navigation system with the above-mentioned configuration will be explained below.

Figure 2:
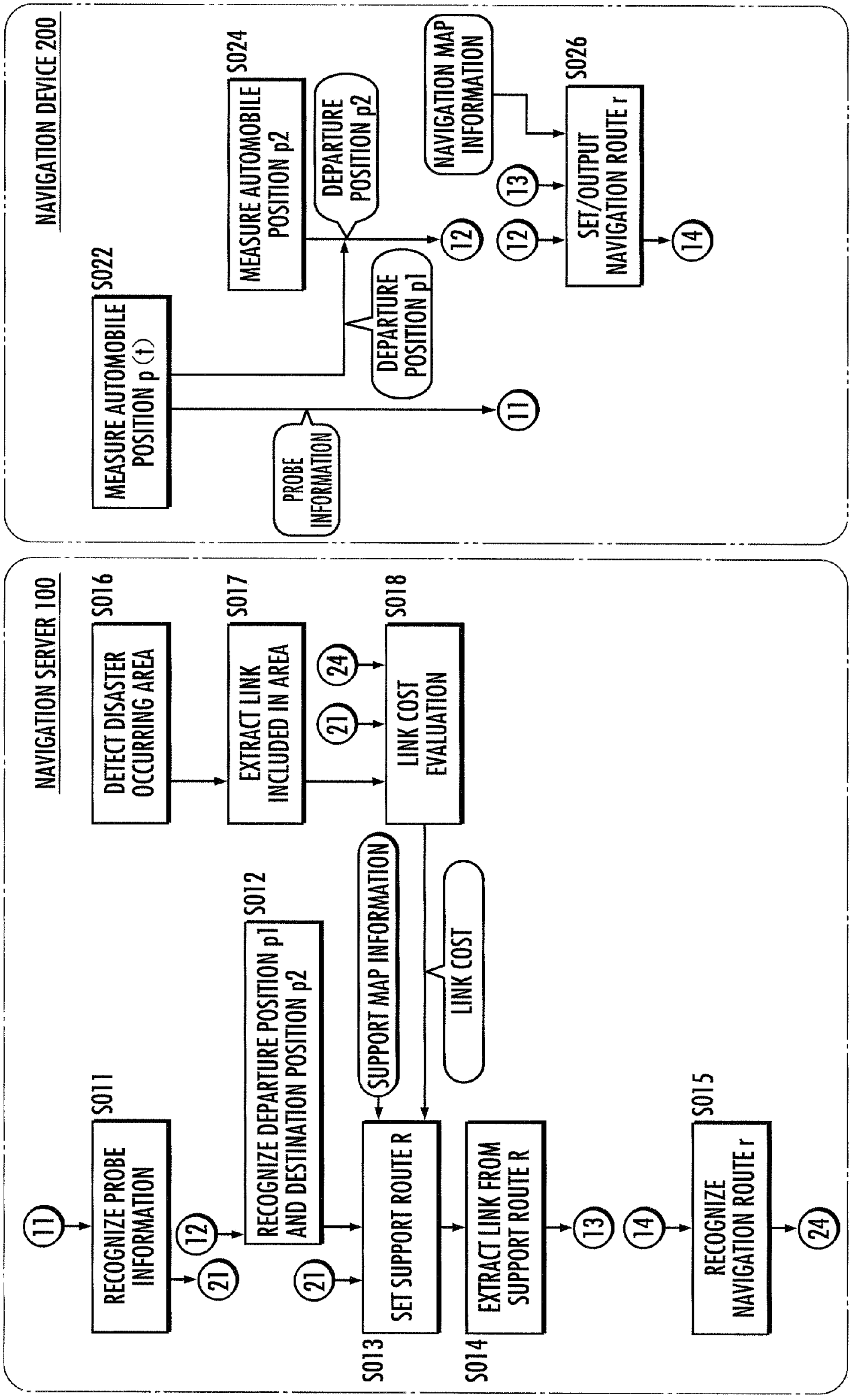
FIG. 2 is a flow chart illustrating functions of the navigation server according to the present invention.

In the navigation device 200, the first processing element 210 measure a position p(t) of the automobile 2 at time t at regular intervals, on the basis of a GPS signal received by a GPS receiver (not shown), or outputs from an acceleration sensor and rate sensor or the like (not shown) mounted on the automobile 2 (FIG. 2/S022). The positions p(t) at plural points in time is transmitted or uploaded to the navigation server 100 as "the probe information" added with the identification information of the automobile 2.

Accordingly, in the navigation server 100, the probe information of the automobile 2 recognized by the first support processing element 110, or is stored or accumulated in the traffic information storing unit 104 by the first support processing element 110 (FIG. 2/S011). On the basis of the accumulated probe information, a statistical calculation results of a cost, such as a required passing time for each link, are obtained. Further, the first support processing element 110 periodically receives the road traffic information from the road traffic information center server, and makes the traffic information storing unit 104 store or memorize the road traffic information in place of the earlier road traffic information. The road traffic information provided from the road traffic information center server includes the cost of each link, the level of which changes according to existence or nonexistence of a traffic regulation, in addition to the required moving time and the traveling distance of each link.

Further, by the input device 201 being operated by the user, the destination position $p_2$ of the automobile 2 is input or set (FIG. 2/S024). The first processing element 210 transmits or uploads the destination position P2 of the automobile 2, and the departure position $p_1$ as the position p(t') of the automobile 2 at input time t' of the destination position $p_2$, to the navigation server 100, after adding the identification information of the automobile 2 thereto.

Accordingly, in the navigation server 100, the first support processing element 110 recognizes the departure position $p_1$ and the destination position $p_2$ of the automobile 2 (FIG. 2/S012). Further, the first support processing element 110 reads the support map information from the support map storing unit 102, reads the probe information and the like from the road traffic information storing unit 104, and sets a support route R which connects the departure position $p_1$ and the destination position $p_2$ of the automobile 2 on the basis of the information read (FIG. 2/S013). The support route R is set under conditions such as the moving distance or a predicted required time to the destination position $p_2$ is the shortest, or a fuel consumption of the automobile 2 with respect to the traveling to the destination position $p_2$ is the best. As will be explained later, when disaster occurs, the support route R is set after adding the cost of the links included in the disaster occurring area, which is evaluated by the second support processing element 120.

Further, the second support processing element 120 extracts a part of or all of the links from a plurality of the links constituting the support route R (FIG. 2/S014). Still further, the second support processing element 120 transmits or downloads the link identifier of the extracted links to the navigation device 200 mounted on the automobile 2 identified by the identification information added to the destination position $p_2$ and the like.

Figure 4:
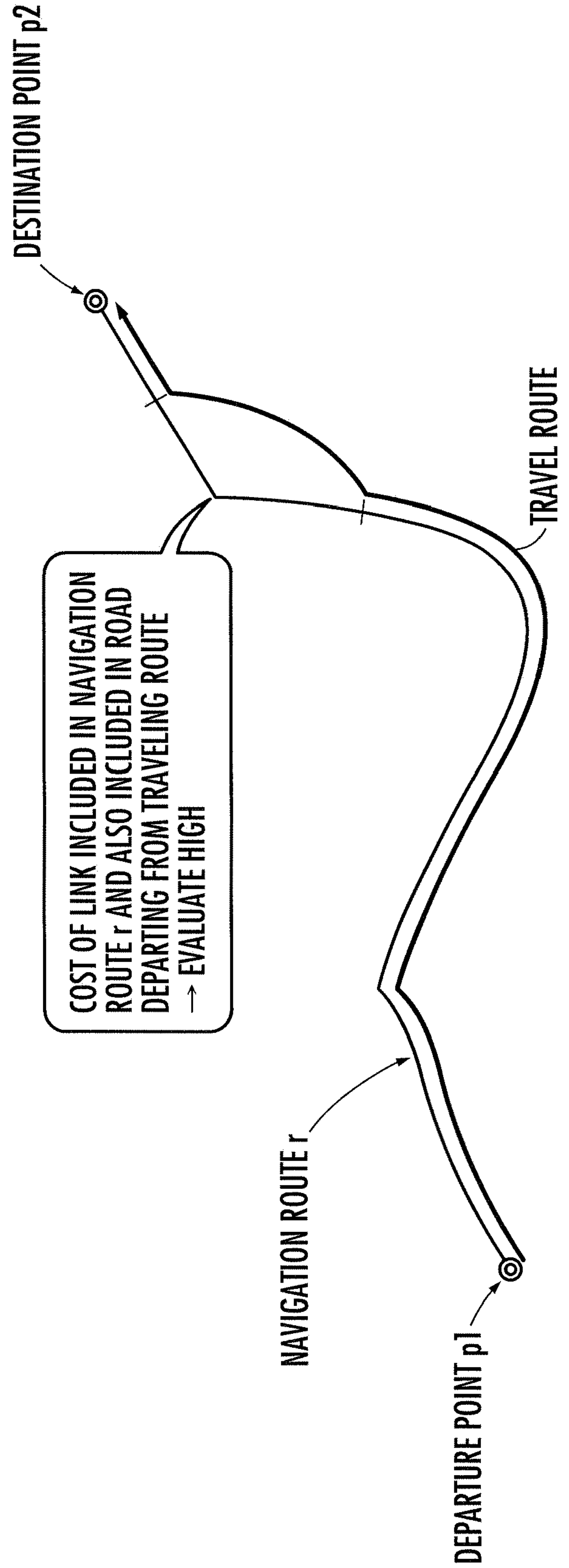
FIG. 4 is a second explanatory diagram on the evaluation method of the link cost.

Accordingly, in the navigation device 200, the navigation route r as is shown in FIG. 4 is set by the second processing element 220 on the basis of the link identifier, the navigation map information stored by the navigation map storing unit 204, the departure position (it may be a current position of the automobile 2 at a time different from the time when the destination position $p_2$ is input) $p_1$ of the automobile 2, and the destination position $p_2$ input earlier, and also is output to the output device 202 along with the navigation map information (FIG. 2/S028). Here, in addition to the navigation route r, icons and the like indicating the current position p(t) and the direction of movement (orientation) of the automobile 2 are output or indicated along with the navigation map information. Further, the second processing element 220 transmits or uploads the link identifier of all of the links constituting the navigation route r added with the identification information of the automobile 2 to the navigation server 100.

Accordingly, in the navigation server 100, the second support processing element 120 recognizes or memorizes the link identifier, and consequently the navigation route r constituted from the links identified by the link identifier (FIG. 2/S015).

The second support processing element 120 recognizes the presence or absence of a disaster by steadily communicating with the disaster information center server 10, and recognizes the disaster occurring area when a disaster occurs or when there is a high probability of an occurrence of a disaster (FIG. 2/S016). Further, the second support processing element 120 extracts the links included in the disaster occurring area on the basis of the support map information (FIG. 2/S017).

Figure 3:
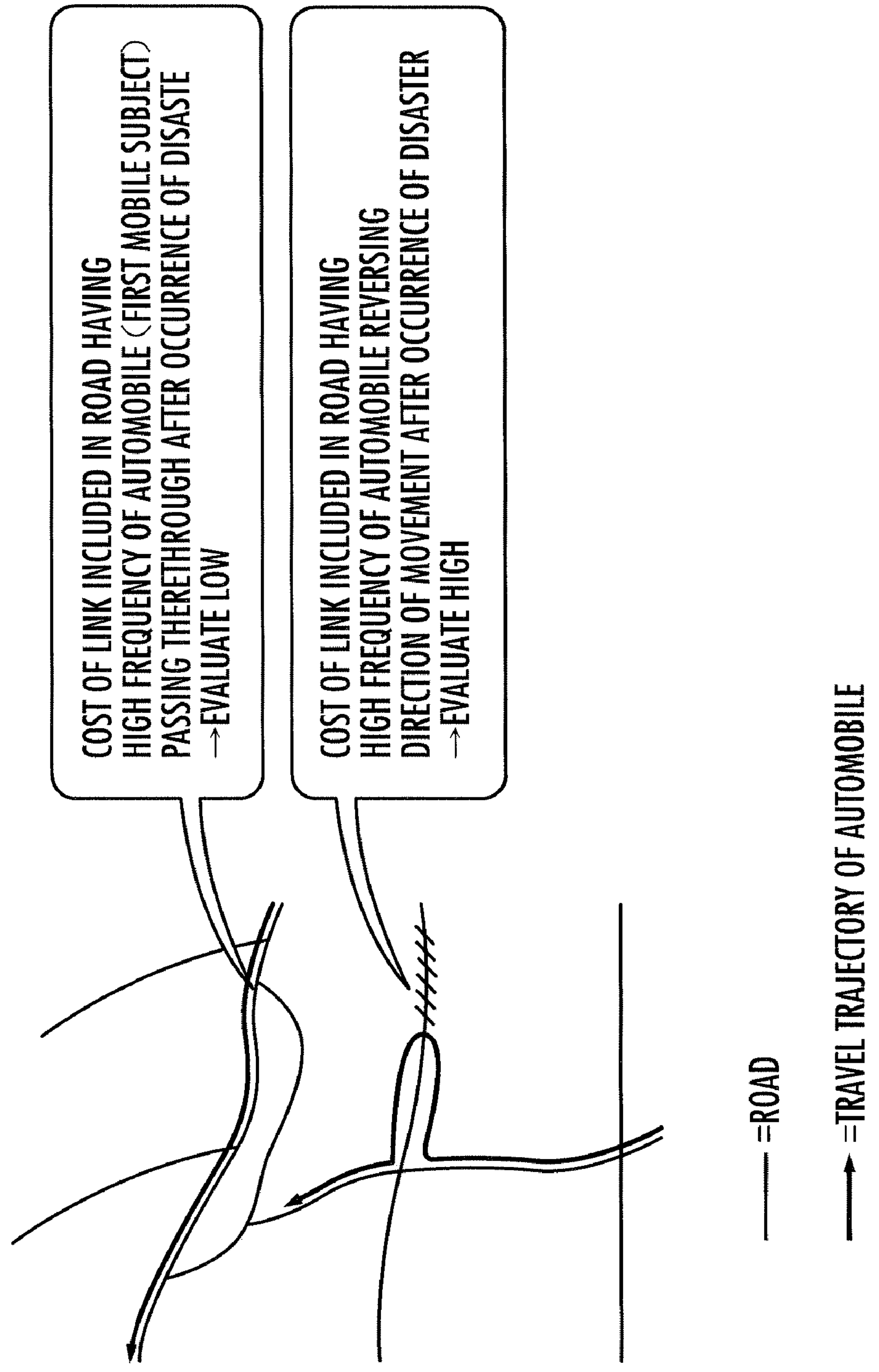
FIG. 3 is a first explanatory diagram on evaluation method of a link cost.

Further, the second support processing element 120 evaluates the cost of the extracted links (FIG. 2/S018). For example, the second support processing element 120 evaluates the cost of the links included in a road having high frequency of the automobile 2 passing therethrough (excludes the case where the direction of movement is reversed, which will be explained next) after the occurrence of the disaster to be low, as is shown in FIG. 3. This is from taking into consideration that the links included in the road having high frequency of the automobile (or the probe car) 2 passing therethrough after occurrence of the disaster have high probability of being less affected by the disaster and therefore safe.

Further, the second support processing element 120 evaluates the cost of the links included in the road having high frequency of the automobile 2 reversing the traveling direction or making a U-turn, after occurrence of the disaster to be high, as is shown in FIG. 3. This is from taking into consideration that the links included in the road having high frequency of the automobile 2 reversing the direction of movement or making a U-turn after occurrence of the disaster have high probability of being affected by the disaster and therefore not safe.

Further, the second support processing element 120 evaluates the cost of the links included in the navigation route r (refer to FIG. 2/S015) and also included in the road having high frequency of departing from the traveling route of the automobile after occurrence of the disaster to be high, as is shown in FIG. 4. This is from taking into consideration that the links included in the navigation route r and also included in the road departing from the traveling route of the automobile 2 after the occurrence of the disaster have high probability of being affected by the disaster to an extent that the automobile 2 must avoid that road and therefore not safe.

Figure 5:
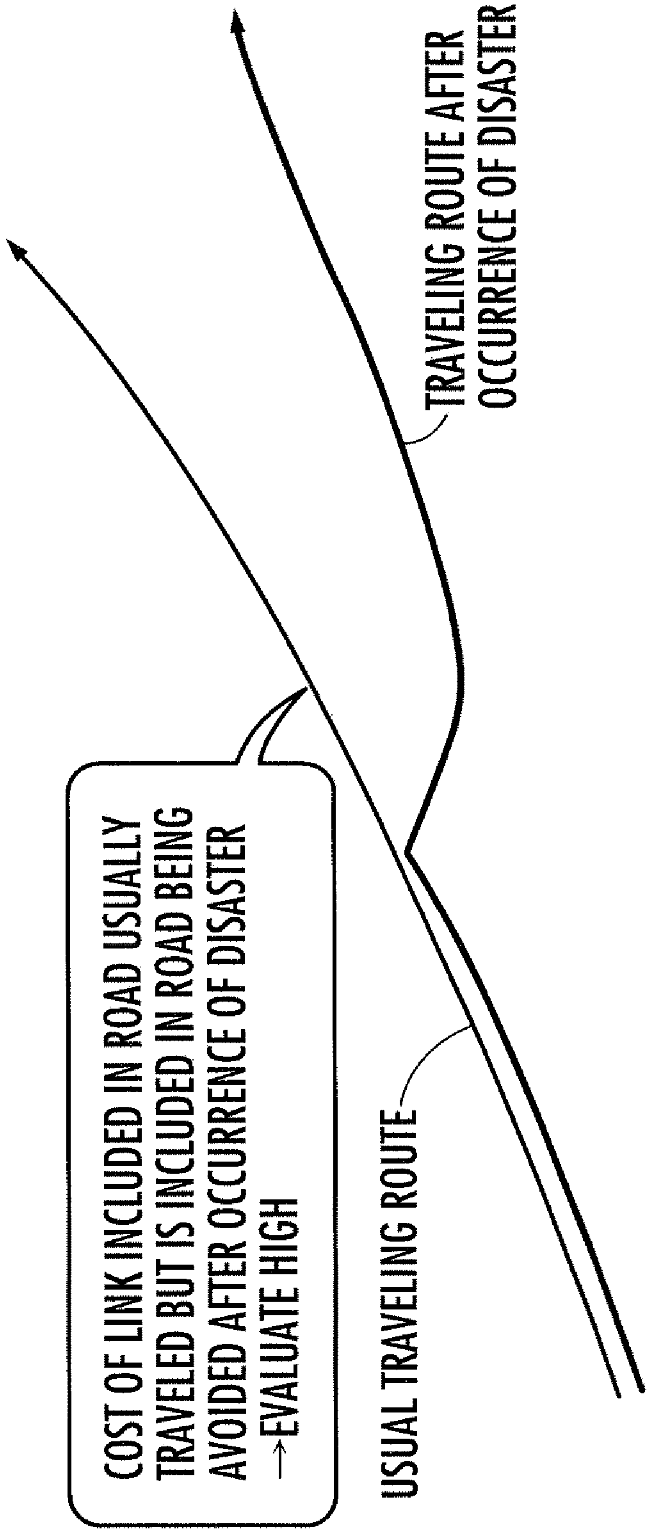
FIG. 5 is a third explanatory diagram on the evaluation method of the link cost.

Further, the second support processing element 120 calculates a deviation of the probe information from before and after the occurrence of the disaster, and evaluates the cost of the links included in the road having large deviation to be high. This is from taking into consideration that the links included in the road having large deviation of the probe information from before and after the occurrence of the disaster have high probability of being affected by the disaster and therefore not safe. For example, of the traveling route calculated from the probe information before occurrence of the disaster, as is shown in FIG. 5, the cost of the links included in the road differing from the traveling route calculated from the probe information after the occurrence of the disaster, even though the probe information is provided with the same identification information, is evaluated to be high. Moreover, the cost of the links included in the road in which the difference between the traffic volume and the average passing time of the automobile 2 calculated from the probe information before occurrence of the disaster and the traffic volume and the average passing time of the automobile 2 calculated from the probe information after occurrence of the disaster is more than a threshold value to be high.

Here, the above-mentioned plurality of methods may be selectively adopted in accordance with the length of the time after lapse from the occurrence of the disaster. Further, the cost of the links included in the disaster occurring area may be finally evaluated by being increased and decreased under the above-mentioned methods from an initial value thereof. The initial value of the cost of individual link after occurrence of the disaster may be set regardless of the cost according to the probe information before occurrence of the disaster and the road traffic information of the road traffic information center, and also may be set by adding the cost according to the occurrence of the disaster to the cost before occurrence of the disaster. Still further, even for the identical link, the cost may be differentiated according to the type of the disaster. For example, in the case where information indicating the combination of the disaster type and the cost thereof is added to the link identifier in the support map information unit, and the second support processing element 120 recognizes the disaster type (earthquake, fire, flood and the like) in addition to the disaster occurring area, the cost of individual link included in the area may be initially set according to the disaster type, and the cost of individual link may be finally evaluated by increasing or decreasing the initial value on the basis of the probe information as is explained above. Still further, the initial value of the cost of the links included in the disaster occurring area may be set according to the degree of the disaster, such as the initial value of the link cost in the earthquake occurring area be set to be higher as the earthquake intensity or the magnitude becomes larger. Still further, the initial value of the cost of the links included in the disaster occurring area may be set to be equally higher than that of the links in other area.

Thereafter, the second support processing element 120 sets the support route R which connects the departure position $p_1$ and the destination position $p_2$ so that it preferentially includes the links having low cost (FIG. 2/S013). Further, the second support processing element 120 extracts the links from the support route R (FIG. 2/S014), and transmits the link identifier of the extracted link as the road traffic information corresponding to the occurrence of the disaster to the navigation device 200. Here, when the current position p(t) of the automobile 2 is in the disaster occurring area or in the vicinity area, the cost of the links included in the above-identified area may be transmitted to the navigation device 200 as the road traffic information at the time of occurrence of the disaster together with the link identifier, independently from the support route R.

As the navigation device 200 being the target of transmission of the road traffic information according to occurrence of the disaster, the navigation device 200 mounted on the automobile 2 in which the departure position $p_1$, the destination position $p_2$, the support route R, or the current position p(t) grasped from the probe information is included in the disaster occurring area or in the vicinity area thereof is selected.

Figure 6:
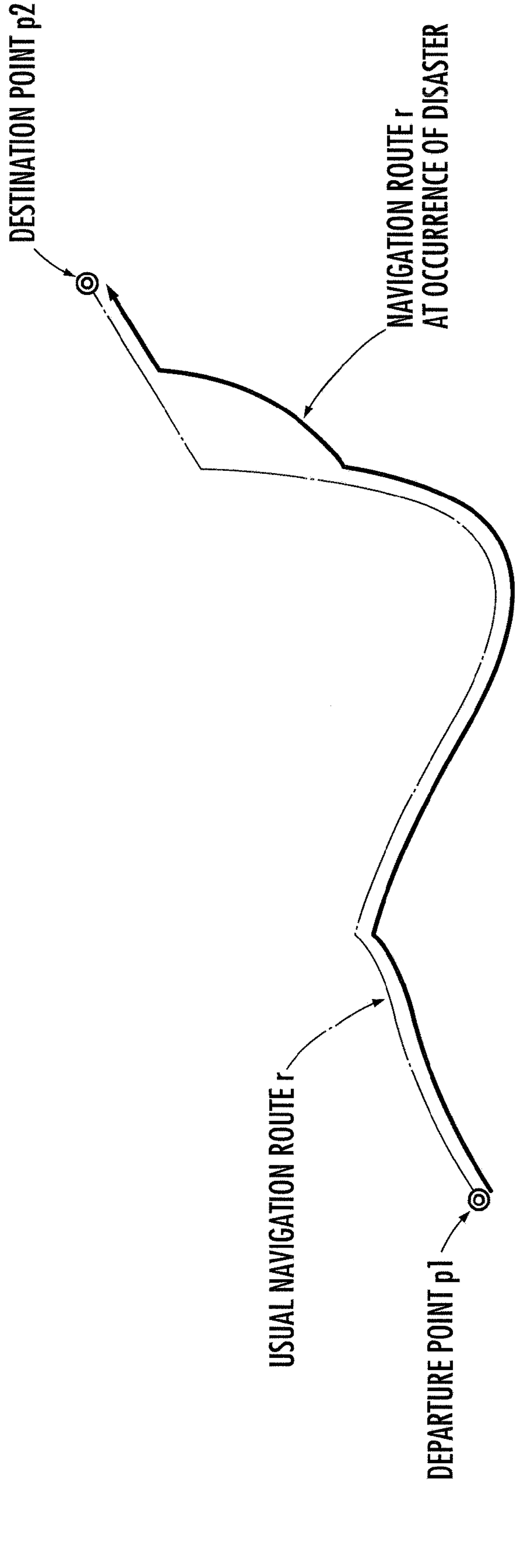
FIG. 6 is an explanatory view with respect to the difference in a navigation route before and after occurrence of a disaster.

Accordingly, in the navigation device 200, the second processing element 220 may set and output the navigation route r as indicated by a solid line in FIG. 6, which is different from the navigation route r during normal times in which no disaster is occurring as indicated by a dot-and-dash line in FIG. 6, at the time of occurrence of the disaster.

In the navigation system exerting the above-mentioned functions, the links included in the disaster occurring area are extracted, and the cost of each of the extracted links is evaluated on the basis of the probe information (refer to FIG. 2/S016 through S108, FIG. 3 through FIG. 5). There is a high probability that the influence of the disaster is reflected in the spatial and temporal moving pattern of the automobile 2 which is represented by the probe information. Therefore, the level of the safeness of individual link in the disaster occurring area may be evaluated as the cost of individual link accurately in consideration of the actual disaster condition and the road condition. Further, by transmitting the road traffic information generated on the basis of the cost of individual link to the navigation device 200, it becomes possible to make the navigation device 200 guide the automobile 2 to avoid the influence of the disaster in consideration of the actual disaster condition and road condition, by the output of the navigation route r and the like (refer to FIG. 2/S026, and FIG. 6).

The invention claimed is:

1. A navigation server which supports guiding of a mobile subject by a navigation device, by transmitting a road traffic information to the navigation device possessed by the mobile subject, the navigation server comprising:

a support map storing unit which stores a support map information including a plurality of links expressed by a series of coordinates;

a first support processing element which receives positions at plural points in time of a first mobile subject from a probe device possessed by the first mobile subject as a probe information; and a second support processing element which generates the road traffic information on the basis of the support map information and the probe information, and which transmits a part of or all of the road traffic information to the navigation device possessed by a second mobile subject;

wherein the second support processing element recognizes an area in which disaster occurred on the basis of communication with a disaster information source, extracts the links included in the area from a plurality of the links, calculates a deviation of the probe information from before and after the occurrence of the disaster, evaluates a cost for each of the extracted links by increasing and decreasing an initial value of the extracted links on the basis of the deviation, and generates the road traffic information on the basis of the cost.

2. The navigation server according to claim 1, wherein the second support processing element evaluates the cost of the links included in the road having high frequency of the first mobile subject passing therethrough after the occurrence of the disaster to be low.

3. The navigation server according to claim 1, wherein the second support processing element evaluates the cost of the links included in the road having high frequency of the first mobile subject reversing a direction of movement thereof after the occurrence of the disaster to be high.

4. The navigation server according to claim 1, wherein the second support processing element recognizes the navigation route set by the navigation device on the basis of communication with the navigation device possessed by the first mobile subject, and evaluates the cost of the links included in the road included in the navigation route and also included in the road having high frequency of departing from the traveling route of the first mobile subject after the occurrence of the disaster to be high.

5. The navigation server according to claim 1, wherein the second support processing element recognizes one of or both of the type and degree of the disaster on the basis of communication with the disaster information source, and sets the initial value of the cost for each of the extracted links on the basis of one of or both of the type and degree of the disaster.

6. The navigation server according to claim 1, wherein the second support processing element recognizes a departure position and destination position of the second mobile subject by communicating with the navigation device, sets a support route which connects the departure position and the destination position so as to preferentially include the links having low cost, and generate information representing a part of or all of the support route as the road traffic information.

* * * * *